United States Patent
Claessens et al.

(10) Patent No.: US 11,275,226 B2
(45) Date of Patent: Mar. 15, 2022

(54) PIVOT INTERLOCK FOR A FIBER MANAGEMENT TRAY

(71) Applicant: COMMSCOPE TECHNOLOGIES LLC, Hickory, NC (US)

(72) Inventors: Bart Mattie Claessens, Hasselt (BE); Roger Joseph Alaerts, Aarschot (BE); William Alan Carrico, Raleigh, NC (US); El Moïz Mohammed Michel Ghammam, Brussels (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/050,177

(22) PCT Filed: Apr. 23, 2019

(86) PCT No.: PCT/US2019/028699
§ 371 (c)(1),
(2) Date: Oct. 23, 2020

(87) PCT Pub. No.: WO2019/209813
PCT Pub. Date: Oct. 31, 2019

(65) Prior Publication Data
US 2021/0103114 A1   Apr. 8, 2021

Related U.S. Application Data

(60) Provisional application No. 62/661,451, filed on Apr. 23, 2018.

(51) Int. Cl.
*G02B 6/00* (2006.01)
*G02B 6/44* (2006.01)

(52) U.S. Cl.
CPC .................. *G02B 6/4455* (2013.01)

(58) Field of Classification Search
CPC ........... G02B 6/4455; G02B 6/44; G02B 6/00
See application file for complete search history.

(56) References Cited

U.S. PATENT DOCUMENTS

| 5,515,472 A | 5/1996 | Mullaney et al. |
| 6,507,691 B1 | 1/2003 | Hunsinger et al. |
| 7,266,280 B2* | 9/2007 | Swenson .............. G02B 6/4453 385/135 |
| 7,697,812 B2 | 4/2010 | Parikh et al. |

(Continued)

FOREIGN PATENT DOCUMENTS

| EP | 2 381 283 A1 | 10/2011 |
| KR | 200380996 Y1 | 4/2005 |
| WO | 2017/103197 A1 | 6/2017 |

OTHER PUBLICATIONS

International Search Report and Written Opinion of the International Searching Authority for International Patent Application No. PCT/US2019/028699 dated Aug. 30, 2019, 6 pages.

(Continued)

*Primary Examiner* — Jennifer Doan
(74) *Attorney, Agent, or Firm* — Merchant & Gould P.C.

(57) ABSTRACT

A pivot interlock for a fiber management tray is disclosed. The pivot interlock is configured for pivotally coupling the fiber management tray to a tray mount. The pivot interlock includes a pivot guide portion and a pivot detent portion.

10 Claims, 21 Drawing Sheets

(56) References Cited

U.S. PATENT DOCUMENTS

| | | | |
|---|---|---|---|
| 8,059,932 B2 * | 11/2011 | Hill .................... | G02B 6/46 |
| | | | 385/135 |
| 8,086,084 B2 | 12/2011 | Bran de Leon et al. | |
| 8,554,044 B2 | 10/2013 | Bran de Leon et al. | |
| 9,075,217 B2 * | 7/2015 | Giraud ................ | G02B 6/4452 |
| 9,658,420 B2 | 5/2017 | Loeffelholz et al. | |
| 9,791,653 B2 | 10/2017 | Aznag et al. | |
| 9,857,547 B2 | 1/2018 | Claessens | |
| 10,310,207 B2 | 6/2019 | Geens et al. | |
| 10,509,189 B2 | 12/2019 | Allen | |
| 10,649,167 B2 | 5/2020 | Cornelissen et al. | |
| 2004/0175090 A1 | 9/2004 | Vastmans et al. | |
| 2011/0255837 A1 | 10/2011 | Solheid et al. | |
| 2017/0363831 A1 | 12/2017 | Cornelissen et al. | |
| 2021/0011239 A1 | 1/2021 | Geens et al. | |

OTHER PUBLICATIONS

Extended European Search Report for European Patent Application No. 19792670.2 dated Dec. 15, 2021, 11 pages.

\* cited by examiner

PIVOT INTERLOCK FOR A FIBER MANAGEMENT TRAY

CROSS-REFERENCE TO RELATED APPLICATION

This application is a National Stage Application of PCT/US2019/028699, filed on Apr. 23, 2019, which claims the benefit of U.S. Patent Application Ser. No. 62/661,451, filed on Apr. 23, 2018, the disclosures of which are incorporated herein by reference in their entireties. To the extent appropriate, a claim of priority is made to each of the above disclosed applications.

TECHNICAL FIELD

The present disclosure relates generally to fiber optic devices such as fiber optic trays for managing optical fibers.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. Optical fibers with the telecommunications enclosures are often managed on trays. The trays are often arranged in a stack and are pivotally mounted to a tray mount. Access to the trays is enhanced by the ability to pivot the trays with respect to each other and with respect to the tray mount.

Improvements are desired.

SUMMARY

One aspect of the present disclosure relates to a robust and reliable pivot interlock for a fiber management tray. In one example, the pivot interlock can have an integrated detent arrangement for holding the fiber management tray at a desired pivot location. In one example, the pivot interlock can have a configuration that is easy to interlock and that allows the fiber management tray to be smoothly pivoted between pivot positions. In one example, the pivot interlock can include a pivot detent portion and a pivot guide portion.

Another aspect of the present disclosure relates to an optical fiber management device including a tray mount and a fiber management tray that are coupled together by a pivot interlock that when interlocked couples the tray mount and the fiber management tray together by a pivotal connection that allows the fiber management tray to pivot relative to the tray mount between a first pivot position and a second pivot position.

The pivot interlock includes a detent pivot arrangement and guide pivot arrangement. The detent pivot arrangement includes a detent pivot pin portion integrated with one of the tray mount and the fiber management tray, and also includes a detent receptacle integrated with the other of the tray mount and the fiber management tray. The detent receptacle is configured for receiving the detent pivot portion when the pivot interlock is interlocked. The detent pivot pin portion includes a plurality of pin flat surfaces positioned circumferentially about the detent pivot pin portion, and the detent receptacle defining a plurality of receptacle flat surfaces.

The guide pivot arrangement includes a cylindrical pivot pin portion integrated with one of the tray mount and the fiber management tray, and also includes a guide receptacle integrated with the other of the tray mount and the fiber management tray. The guide receptacle is configured for receiving the cylindrical pivot pin portion when the pivot interlock is interlocked. The guide receptacle has an open end positioned opposite from a closed end. The open end is configured to allow the cylindrical pivot pin portion to be inserted into the guide receptacle, and the closed end includes a guide surface having a concave curvature that curves along a convex curvature of the cylindrical pivot pin portion when the pivot interlock is interlocked.

The fiber management tray pivots between the first and second pivot positions relative to the tray mount about a pivot axis. When pivot interlock is interlocked, the pivot axis extends axially though the cylindrical pivot pin portion, the detent pivot pin portion, the guide receptacle and the detent receptacle. As the fiber management tray is pivoted between the first pivot position and the second pivot position, at least some of the pin flat surfaces and the receptacle flat surfaces engage one another to cause the detent receptacle to elastically deform and the cylindrical pin portion concurrently pivots within the guide receptacle. An interaction between the pin flat surfaces and the receptacle flat surfaces provides a tray retention force for retaining the fiber management tray in the first and second pivot positions.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventions and inventive concepts upon which the examples disclosed herein are based.

DETAILED DESCRIPTION

Figure 1:
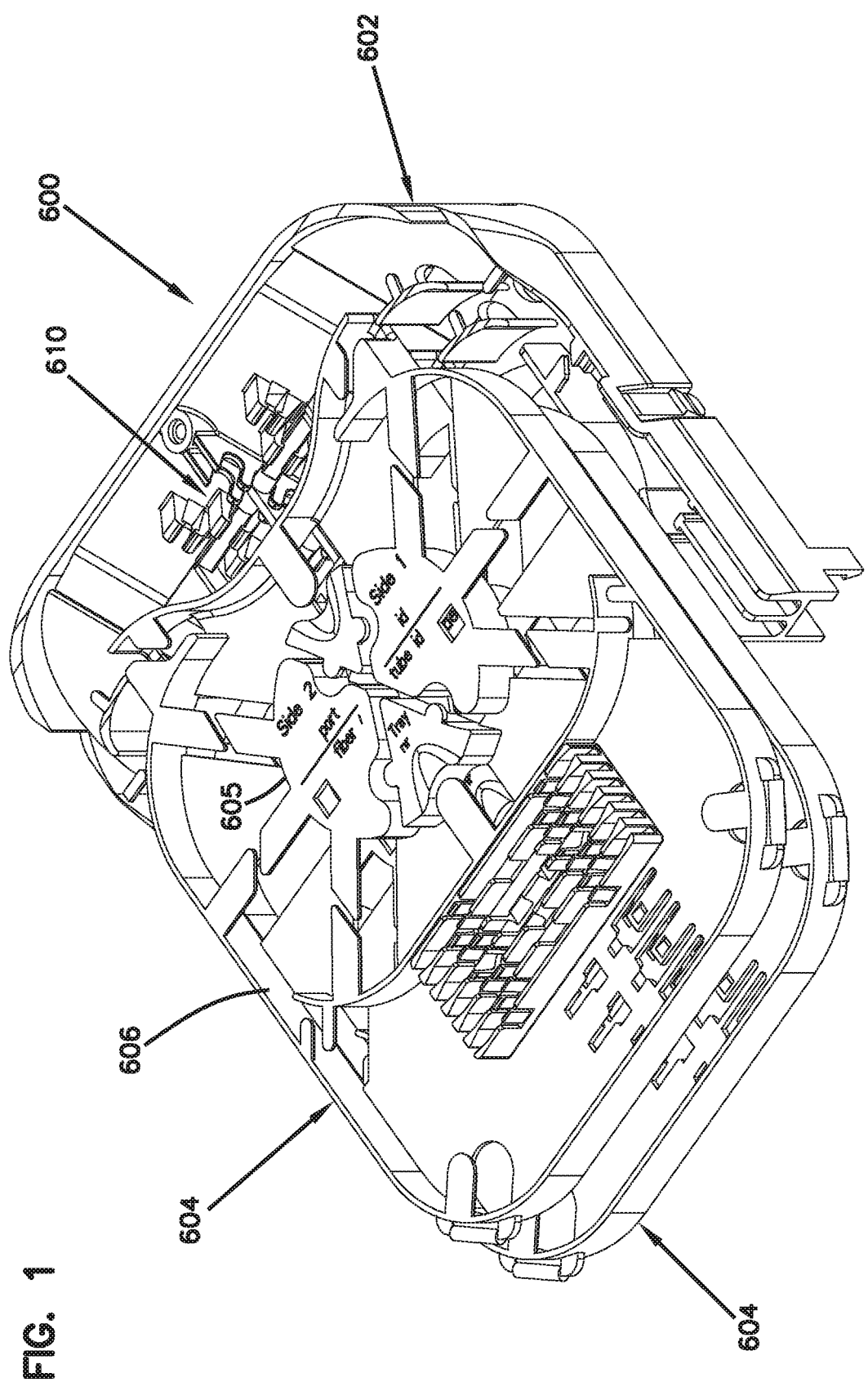
FIG. 1 is a perspective view of an example fiber management device including fiber management trays coupled to a tray mount using pivot interlocks configured in accordance with the principles of the present disclosure.

FIG. 1 depicts an optical fiber management device 600 in accordance with the principles of the present disclosure. The optical fiber management device 600 includes a tray mount 602 and a plurality of fiber management trays 604 that pivotally connect to the tray mount 602. The fiber management trays 604 can be arranged in an overlapping, stacked relationship when coupled to the tray mount 602. Each of the fiber management trays 604 can have a molded, plastic construction and can define one or more fiber routing paths for routing optical fibers thereon. The fiber management trays 604 can include fiber bend radius limiters 605 which may be arranged for routing the optical fibers in storage loops or other paths without violating minimum bend radius requirements of the optical fibers. In some examples, the fiber management trays 604 can include side walls 606 that extend about perimeters of the tray. In some examples, the fiber management trays 604 can include structures for holding fiber optic components such as fiber optic splices enclosed within splice protectors, passive optical power splitters, wavelength division multi-plexers and the like.

Figure 2:
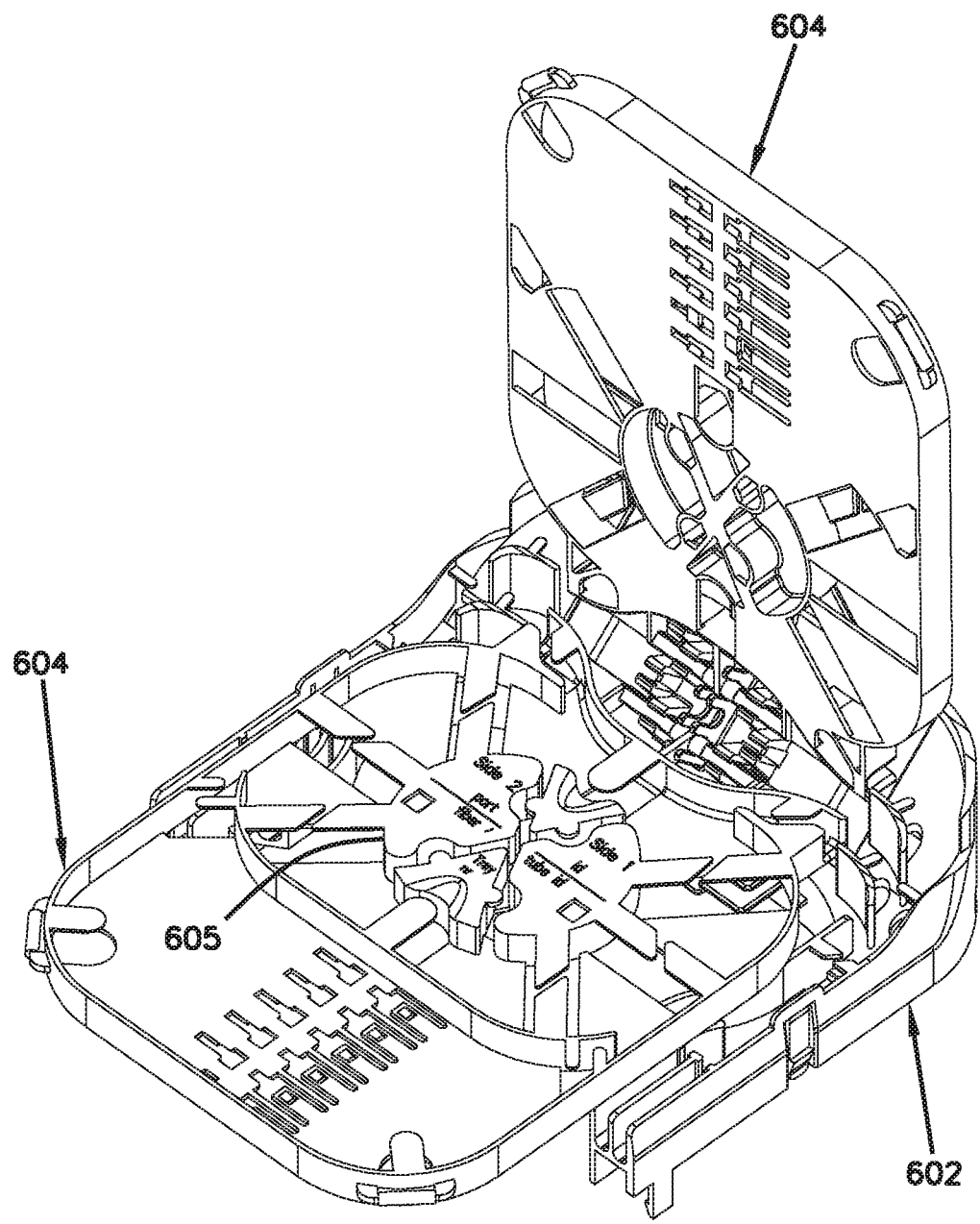
FIG. 2 shows the fiber management device of FIG. 1 with one of the trays disposed in a second position and another of the trays disposed in a first position.
Figure 3:
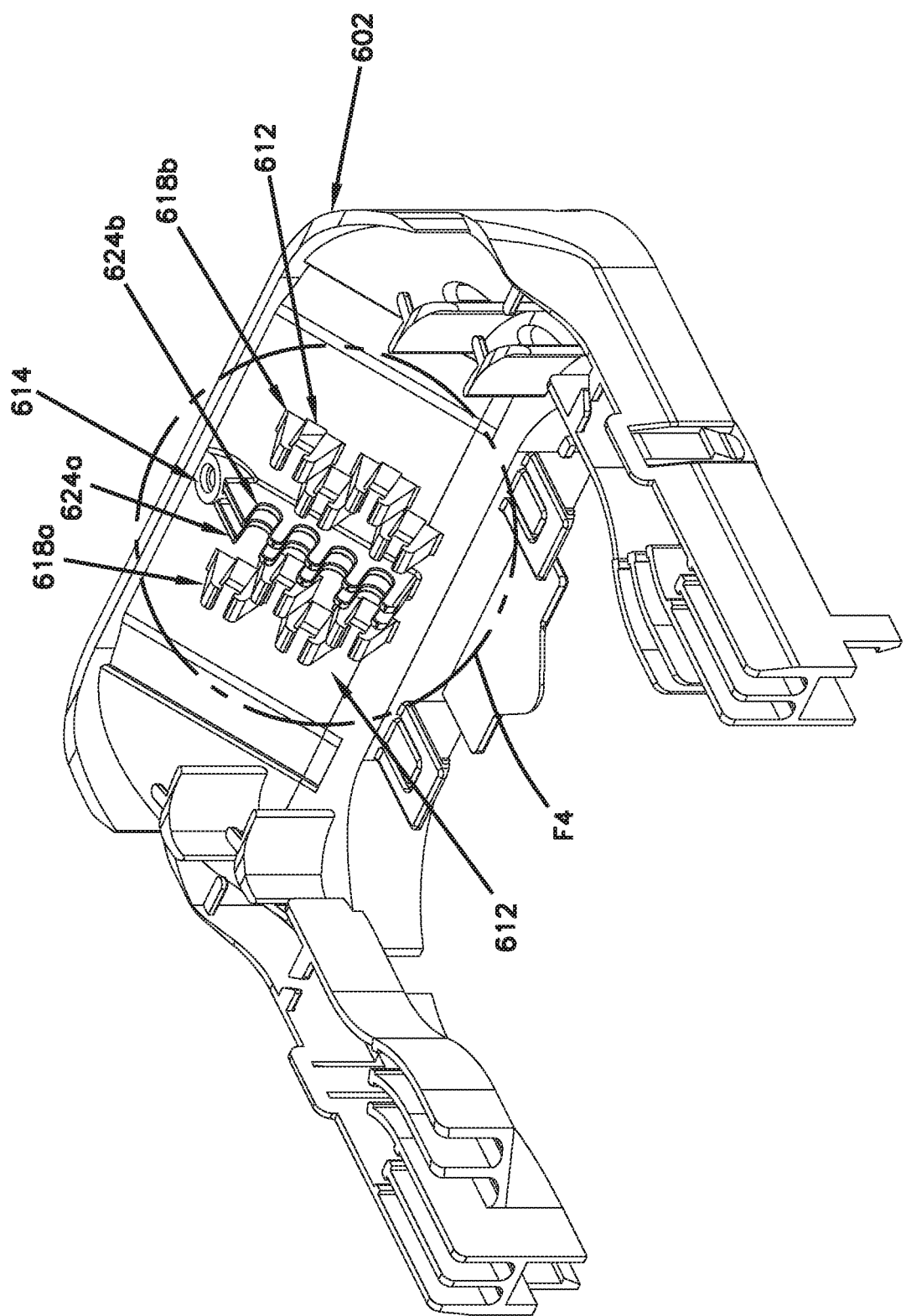
FIG. 3 is a perspective view of an example tray mount suitable for use in the fiber management device of FIG. 1.

The fiber management trays 604 are coupled to the tray mount 602 by pivot interlocks 610. The pivot interlocks 610 are configured to couple the fiber management trays 604 to the tray mount 602 in a manner in which the fiber management trays 604 are permitted to pivot relative to the tray mount 602 and also relative to one another. In one example, the pivot interlocks 610 allow each of the fiber management trays 604 to be pivoted between a first position (see FIG. 1) and a second positon (see FIG. 2). Each of the pivot interlocks 610 includes a detent pivot arrangement 612 and guide pivot arrangement 614.

The detent pivot arrangement 612 includes first and second axially spaced-apart detent pivot pin portions 616a, 616b integrated with the fiber management tray 604, and first and second axially spaced-apart detent receptacle 618a, 618b integrated with the tray mount 602. The first and second detent receptacles 618a, 618b are configured to respectively receive the first and second detent pivot portions 616a, 616b when the pivot interlock 610 is interlocked. The detent pivot pin portions 616a, 616b each include a plurality of pin flat surfaces 620 positioned circumferentially about the detent pivot pin portions 616a, 616b. The detent receptacles 618a, 618b each define a plurality of receptacle flat surfaces 622.

The guide pivot arrangement 614 includes first and second cylindrical pivot pin portions 624a, 624b integrated with the fiber management tray 604, and first and second guide receptacles 626a, 626b integrated with the tray mount 602. The first and second cylindrical pivot pin portions 624a, 624b are positioned between and co-axially aligned with the first and second detent pivot pin portions 616a, 616b. The first and second guide receptacles 626a, 626b are positioned between and co-axially aligned with the first and second detent receptacles 618a, 618b. The first and second guide receptacles 626a, 626b are configured for respectively receiving the first and second cylindrical pivot pin portions 624a, 624b when the pivot interlock 610 is interlocked. The guide receptacles 626a, 626b each have an open end 630 positioned opposite from a closed end 632. The open ends 630 are configured to allow the cylindrical pivot pin portion 624a, 624b to be inserted into the guide receptacles 626a, 626b. The closed ends 632 include guide surfaces 634 having a concave curvatures that curve along (e.g., around) convex curvatures of the cylindrical pivot pin portions 624a, 624b when the pivot interlock 610 is interlocked.

When pivot interlock 610 is interlocked, the fiber management tray 604 can pivot relative to the tray mount 602 about a pivot axis 636. The pivot axis 636 extends axially though the cylindrical pivot pin portion 624a, 624b, the detent pivot pin portion 616a, 616b, the guide receptacles 626a, 626b and the detent receptacle 618a, 618b. When the fiber management tray 604 is pivoted between the first pivot position and the second pivot position, at least some of the pin flat surfaces 620 and the receptacle flat surfaces 622 engage one another to cause the detent receptacles 618a, 618b to elastically deform (e.g., expand) and the cylindrical pivot pin portions 624a, 624b concurrently pivot within the guide receptacles 626a, 626b to guide pivoting about the pivot axis 636. The interaction between at least some of the pin flat surfaces 620 and the receptacle flat surfaces 622 provides a tray retention force for retaining the fiber management tray in the first and second pivot positions.

Figure 4:
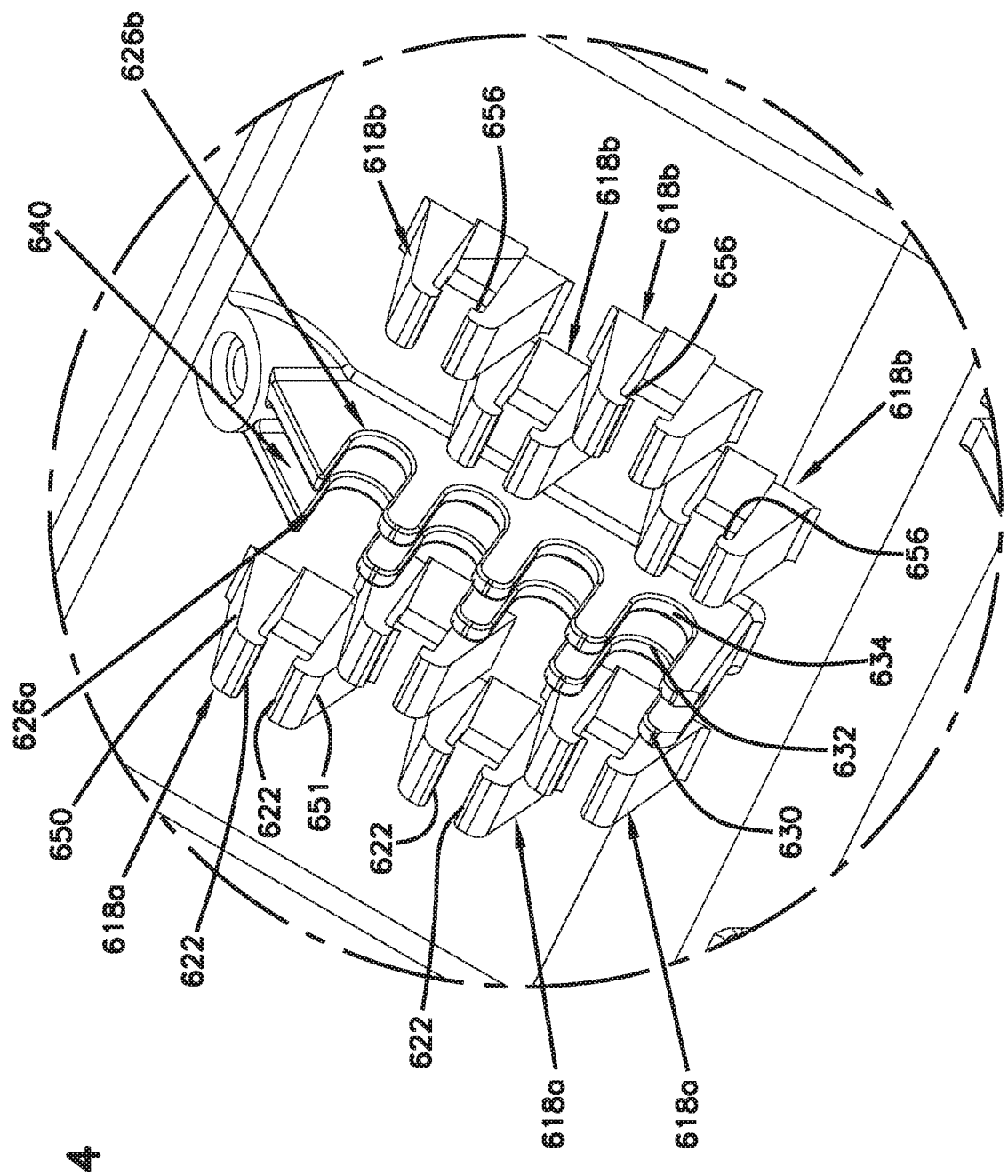
FIG. 4 is an enlarged view of a portion of FIG. 3.
Figure 5:
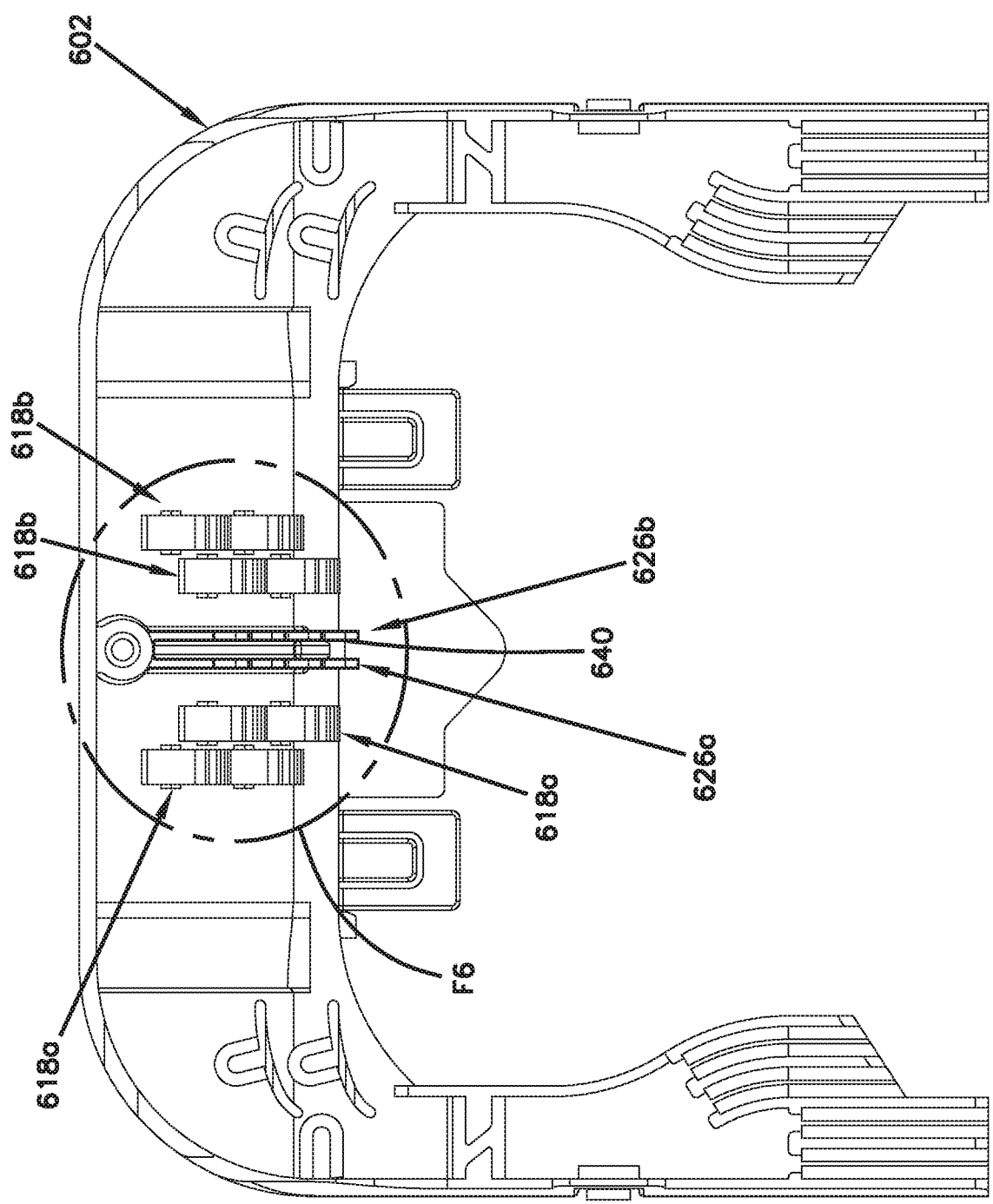
FIG. 5 is a top plan view of the tray mount of FIG. 3.
Figure 6:
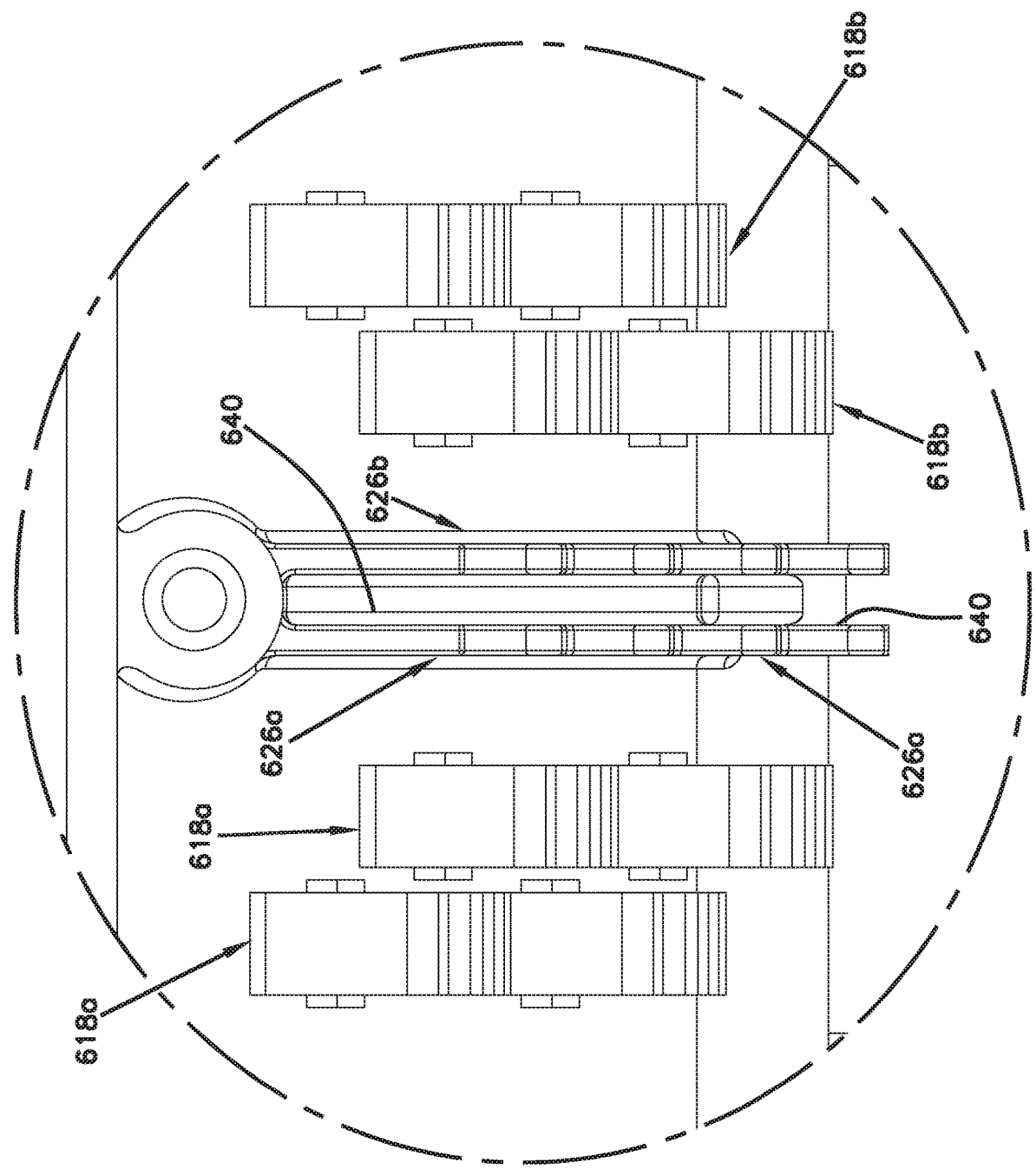
FIG. 6 is an enlarged view of a portion of FIG. 5.
Figure 7:
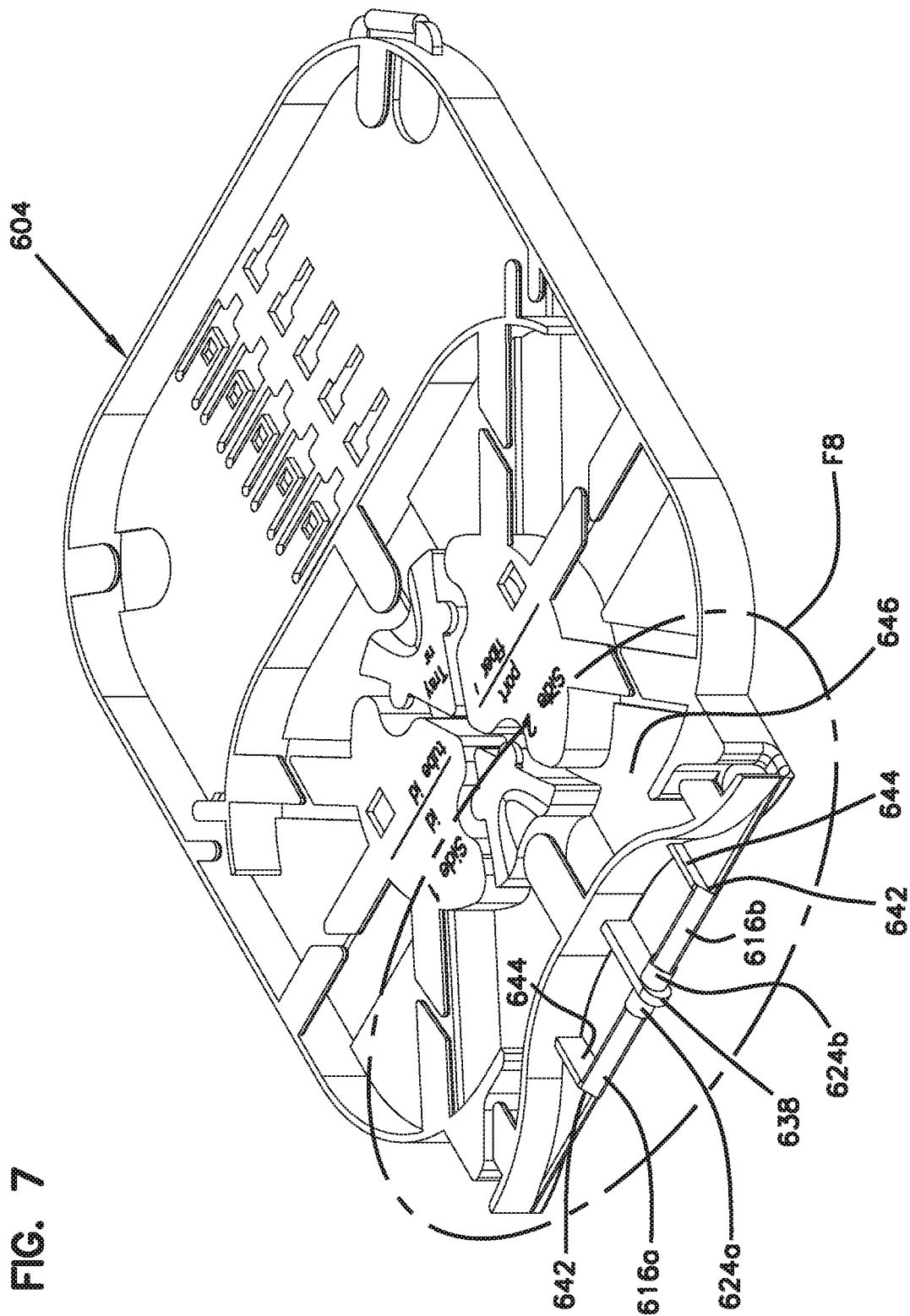
FIG. 7 is a perspective view of an example fiber management tray suitable for use in the fiber management device of FIG. 1.
Figure 8:
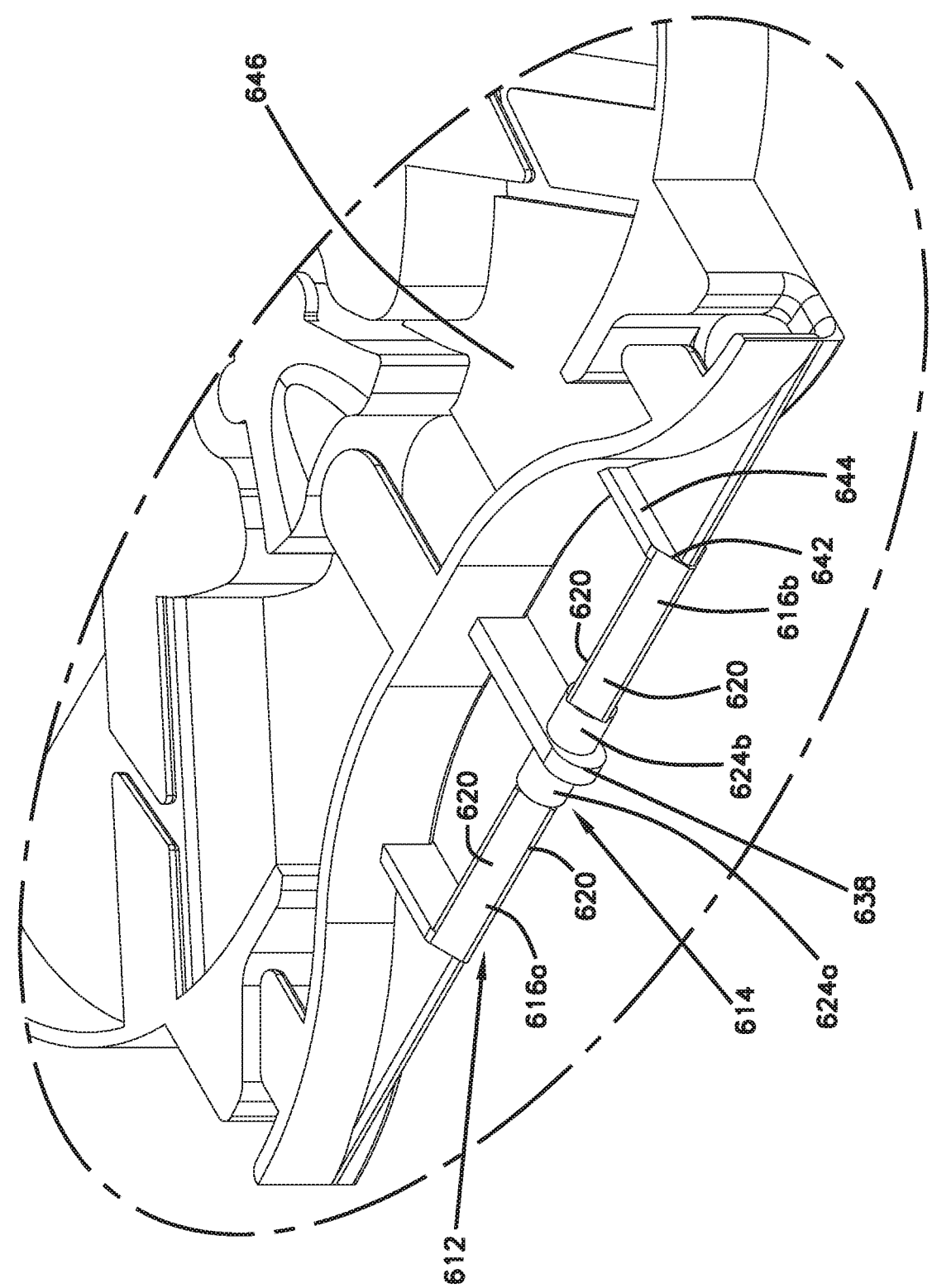
FIG. 8 is an enlarged view of a portion of FIG. 7.
Figure 9:
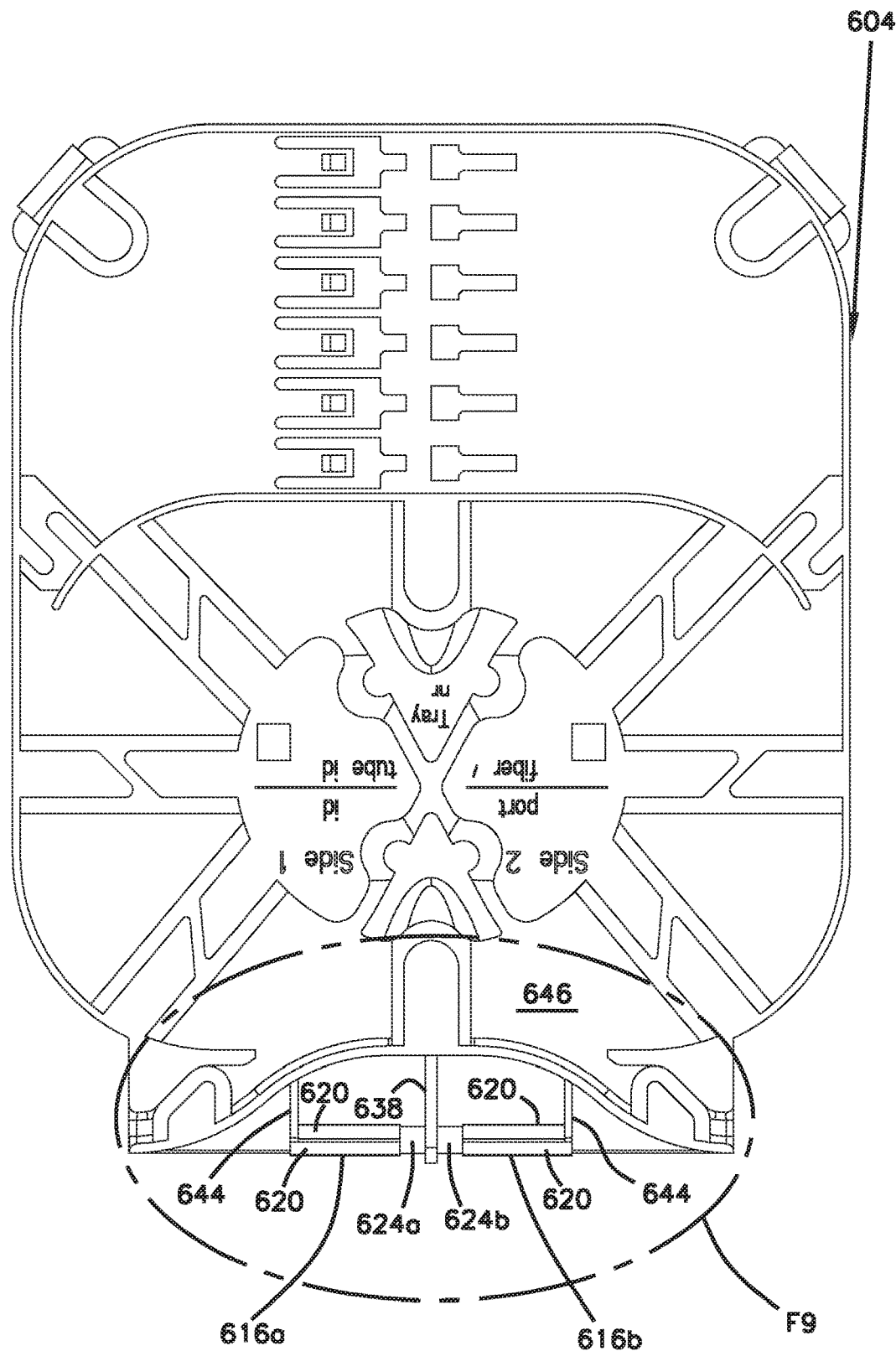
FIG. 9 is a top plan view of the fiber management tray of FIG. 7.
Figure 10:
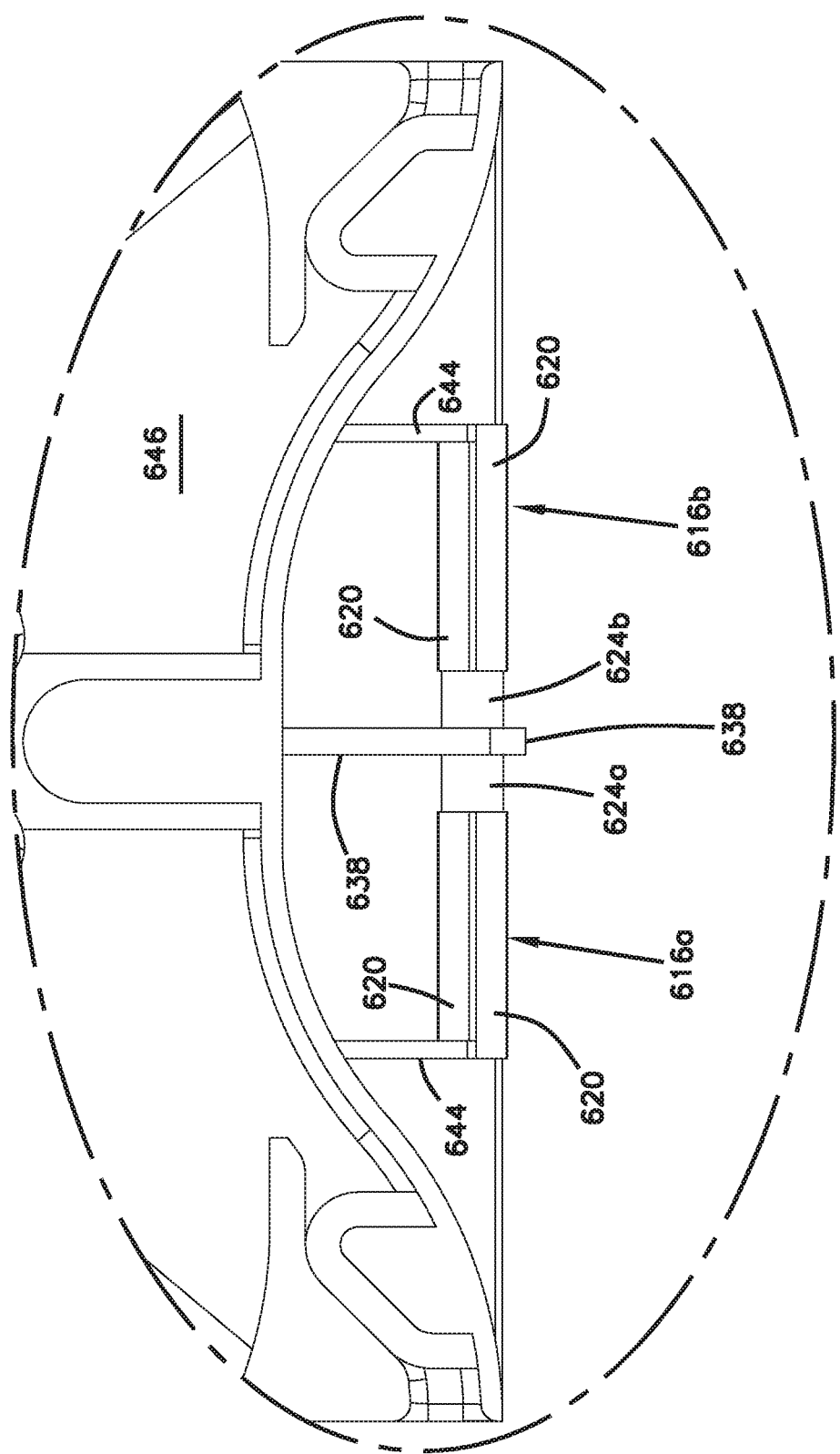
FIG. 10 is an enlarged view of a portion of FIG. 9.
Figure 11:
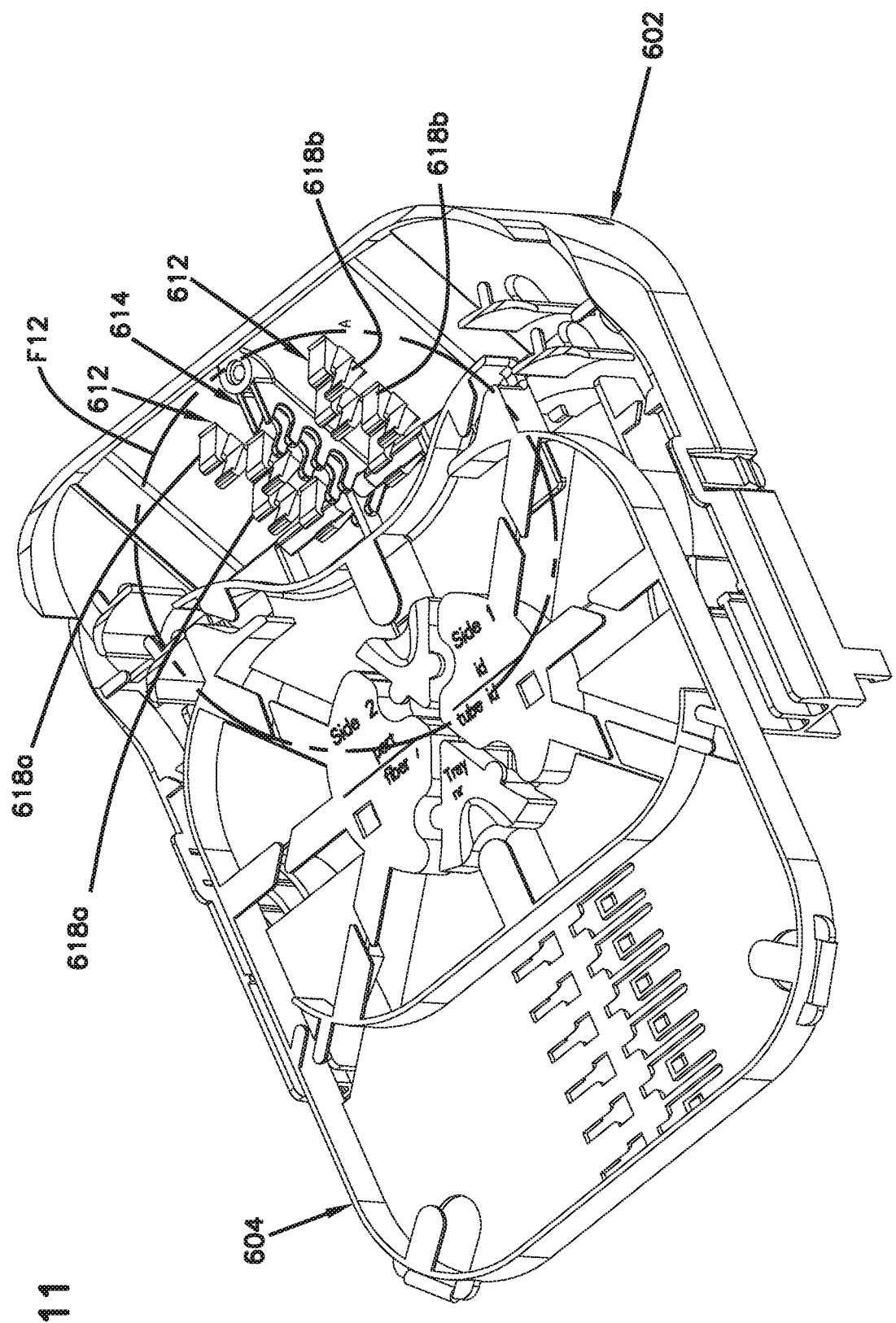
FIG. 11 shows the fiber management device of FIG. 1 with only one fiber management tray coupled to the tray mount and disposed in the first position.
Figure 12:
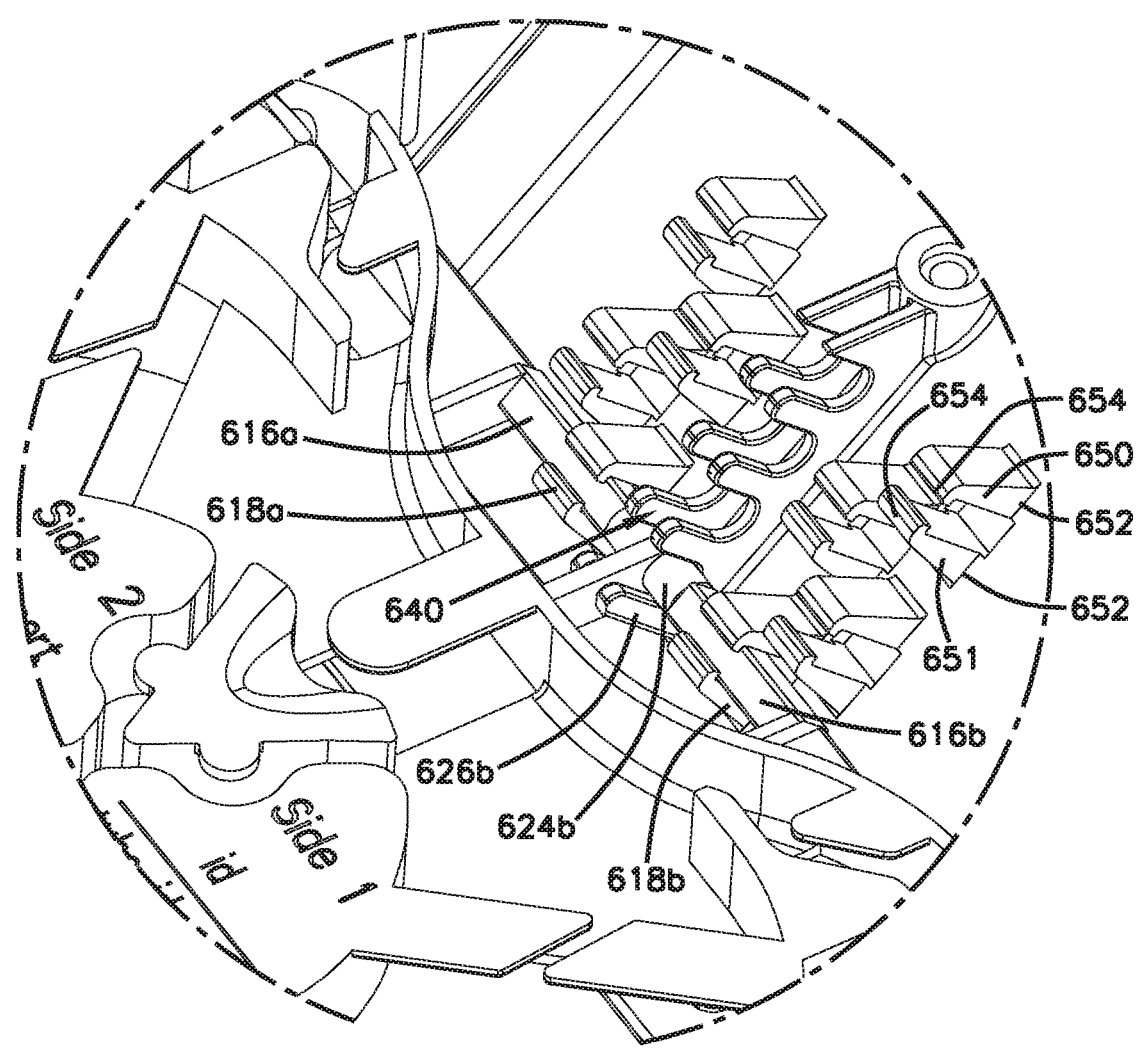
FIG. 12 is an enlarged view of a portion of FIG. 11.
Figure 13:
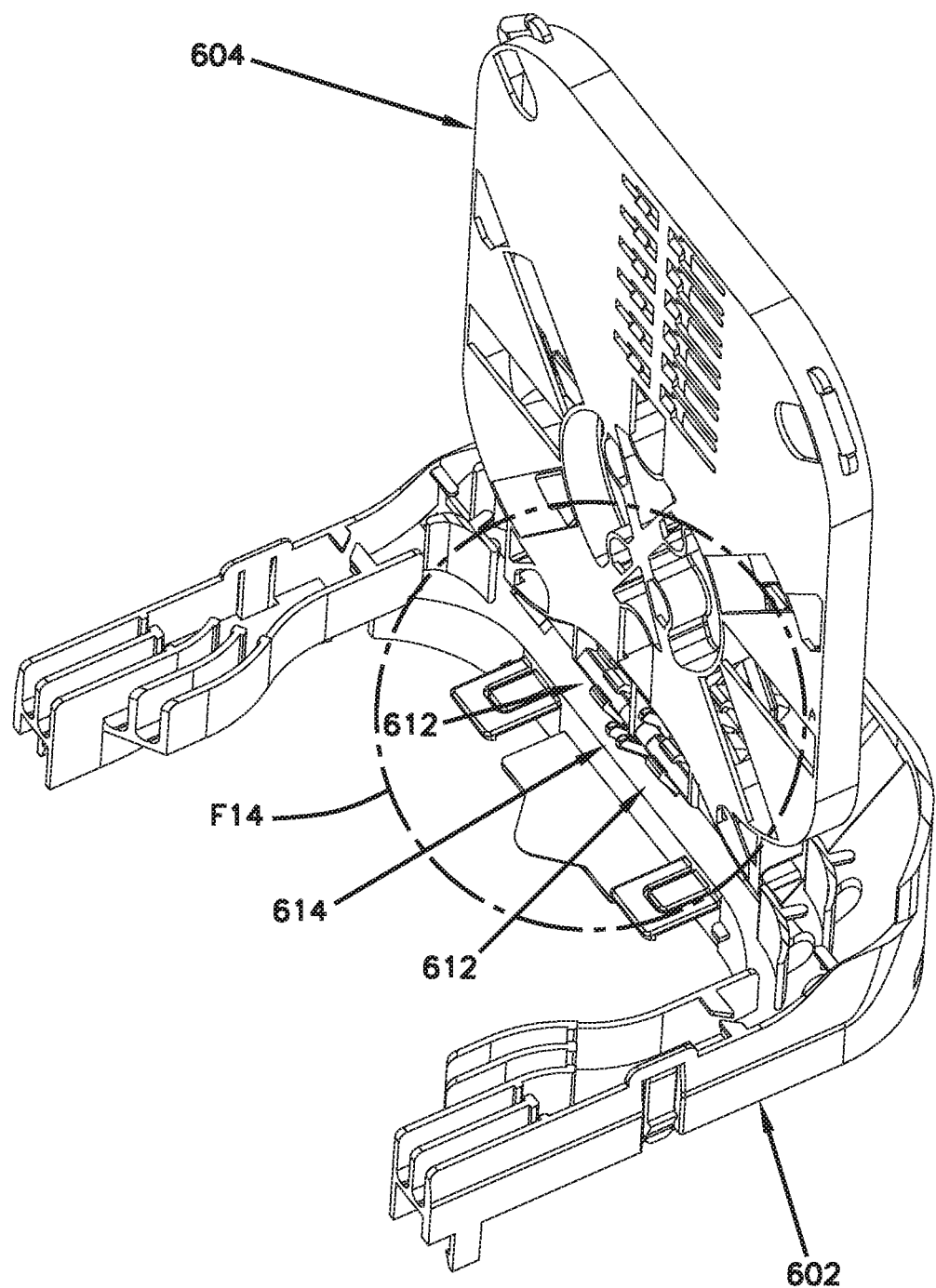
FIG. 13 shows the fiber management device of FIG. 11 with the fiber management tray disposed in the second position.
Figure 14:
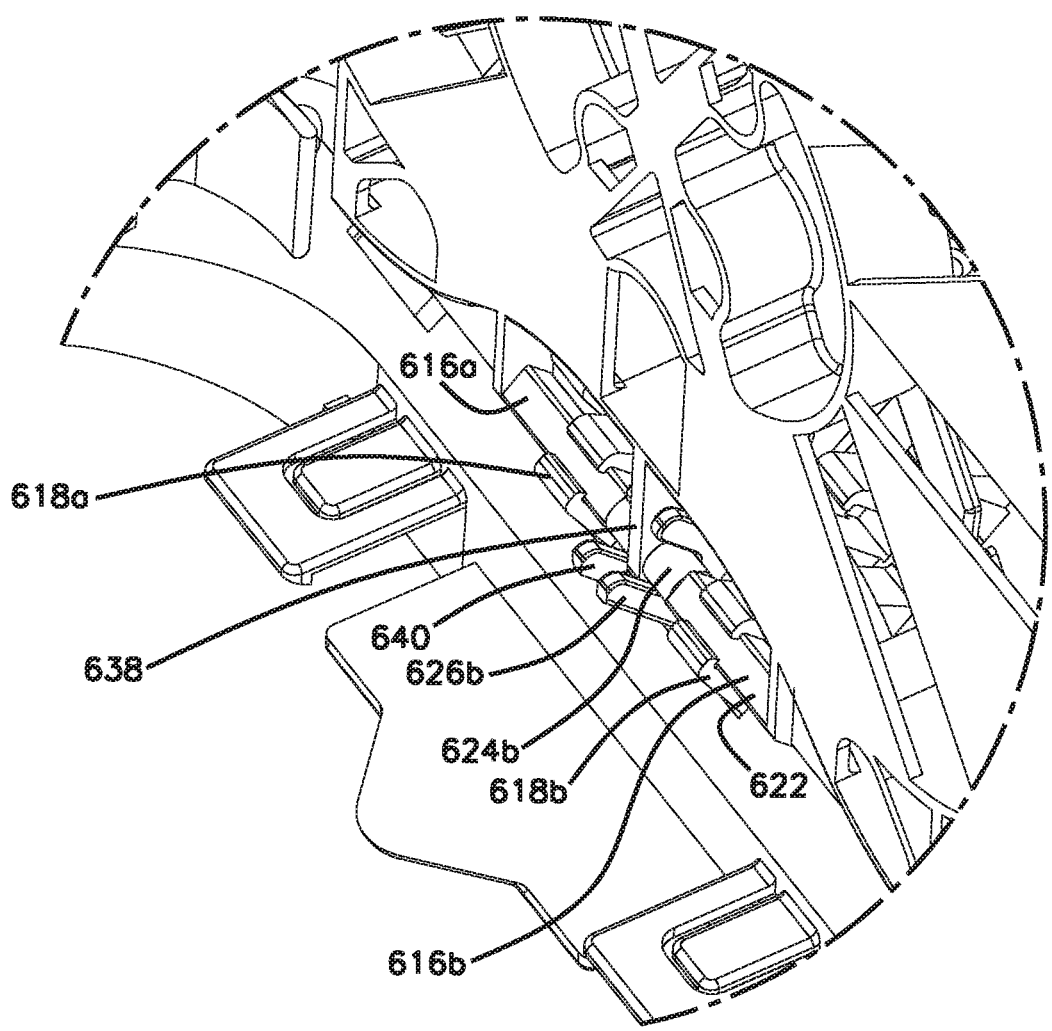
FIG. 14 is an enlarged view of a portion of FIG. 13.
Figure 15:
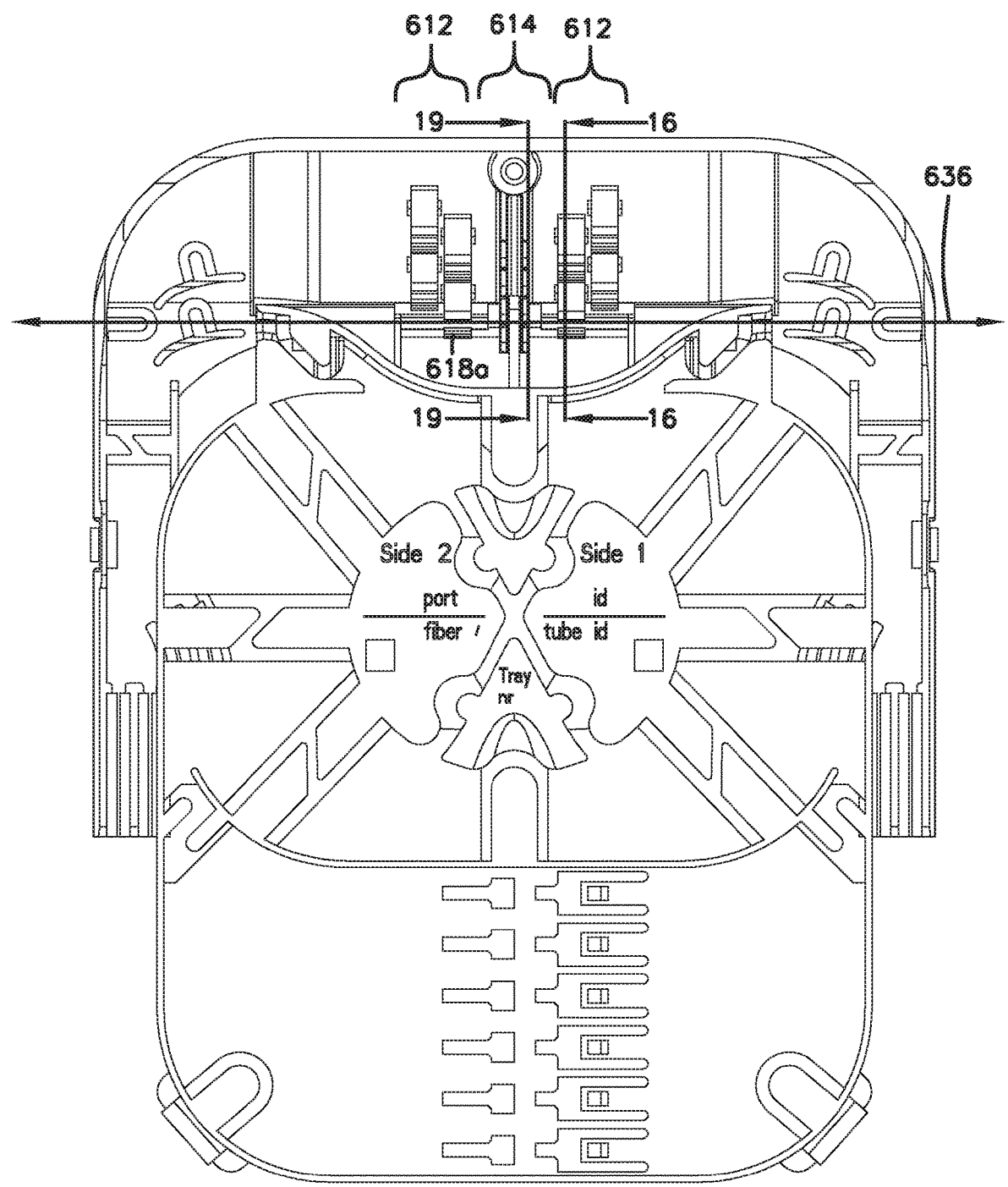
FIG. 15 is a top plan view of the fiber management device of FIG. 11.

Referring to FIGS. 4 and 7, the first and second cylindrical pivot pin portions 624a, 624b are separated by a central flange 638, and the first and second guide receptacles 626a, 626b are separated a central slot 640. When the pivot interlock 610 is interlocked, the central flange 638 fits within the central slot 640 to limit axial movement of the fiber management tray 604 relative to the tray mount 602 along the pivot axis 636 (e.g., see FIG. 12).

Outer ends 642 of the first and second detent pivot pin portions 616a, 616b are integrally coupled to end flanges 644 which are coupled to a main body 646 of the fiber management tray 604. Inner ends 648 of the first and second detent pivot pin portions 616a, 616b are integrally coupled to outer ends 650 of the first and second cylindrical pivot pin portions 624a, 624b. Inner ends 652 of the first and second cylindrical pivot pin portions 624a, 624b are integrally connected to the central flange 638. The central flange 638 is coupled to the main body 646 of the fiber management tray 604. The central flange 636 and the end flanges 644 offset the first and second detent pivot pin portions 616a, 616b and the first and second cylindrical pivot pin portions 624a, 624b from the main body 646 of the fiber management tray 604.

In one example, the detent receptacles 618a, 618b elastically deform as the fiber management tray 604 is pivoted between the first and second pivot positions, and the guide receptacles 626a, 626b do not elastically deform as the fiber management tray 604 is moved between the first and second pivot positions. In one example, as the fiber management tray 604 is pivoted between the first and second pivot positions, a maximum deformation of the detent receptacles 618a, 618b occurs at a central pivot position (see FIG. 17) between the first and second pivot positions. The detent receptacles 618a, 618b are preferably in a stable state when the fiber management tray 604 in the first and second pivot positions. When the detent receptacles 618a, 618b are in the stable state, the detent receptacles 618a, 618b are either not elastically deformed or have less elastic deformation as compared when the fiber management tray 604 has been pivoted to a pivot position between the first and second pivot positions. When the fiber management tray 604 is in a pivotal position between the central pivot position and the first pivot position, the detent arrangement biases the fiber management tray 604 toward the first position. When the fiber management tray 604 is in a pivotal position between the central pivot position and the second pivot position, the detent arrangement biases the fiber management tray 604 toward the second position.

Figure 16:
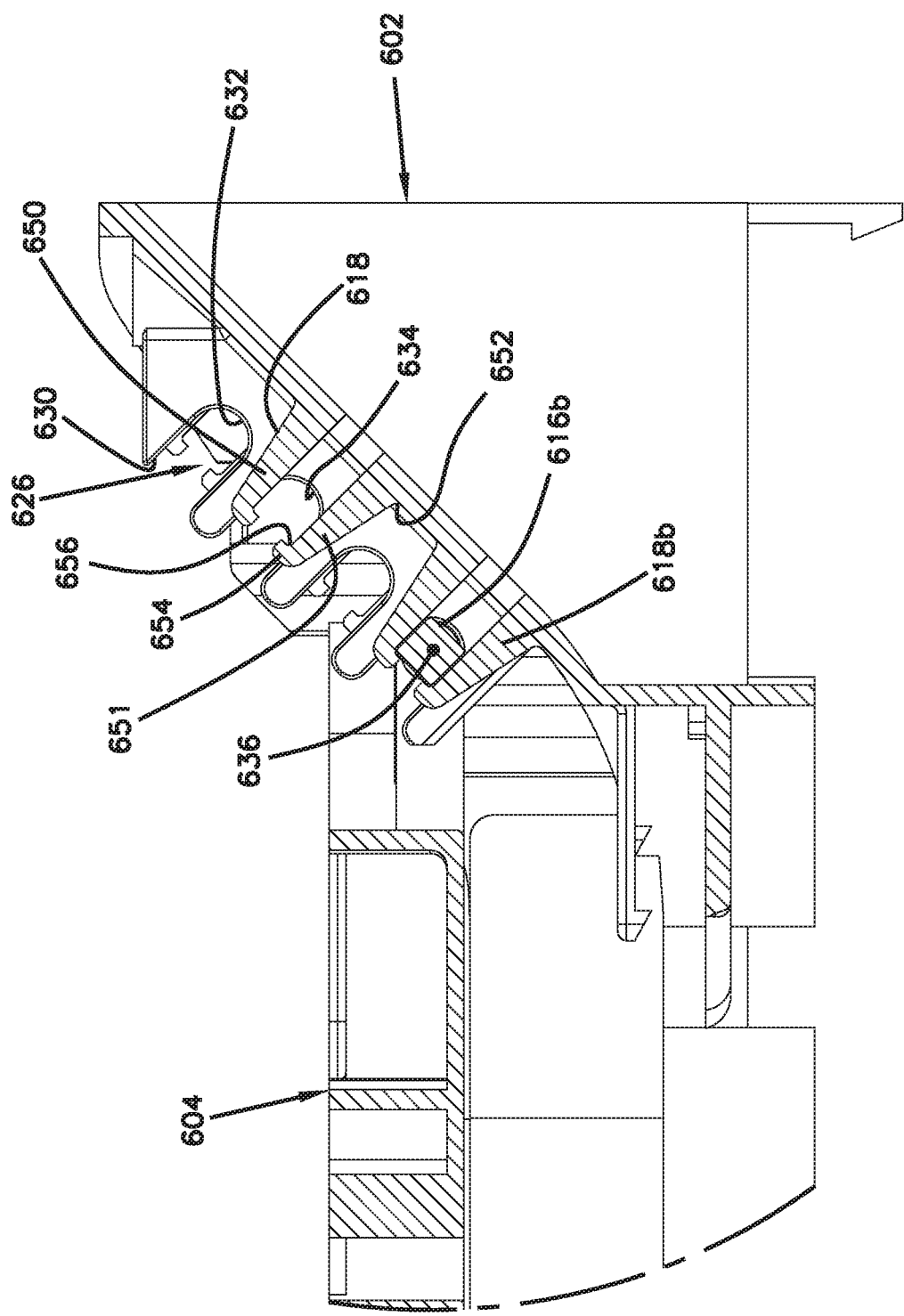
FIG. 16 is a cross-sectional view taken along the 16-16 line of FIG. 15, which cuts through one of the detent pivot arrangements.
Figure 17:
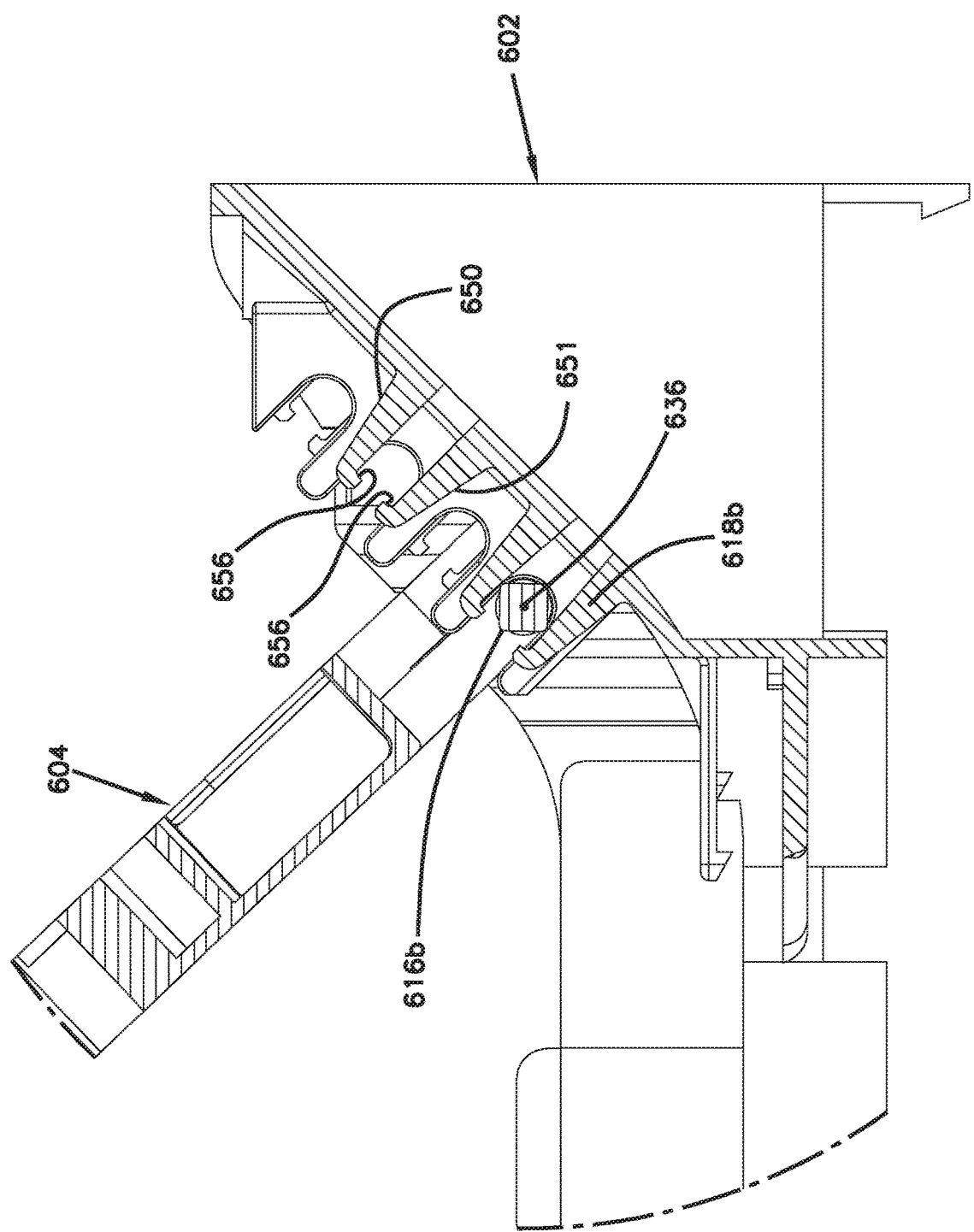
FIG. 17 shows the cross-sectional view of FIG. 16 with the tray moved to a pivotal position between the first and second position.
Figure 18:
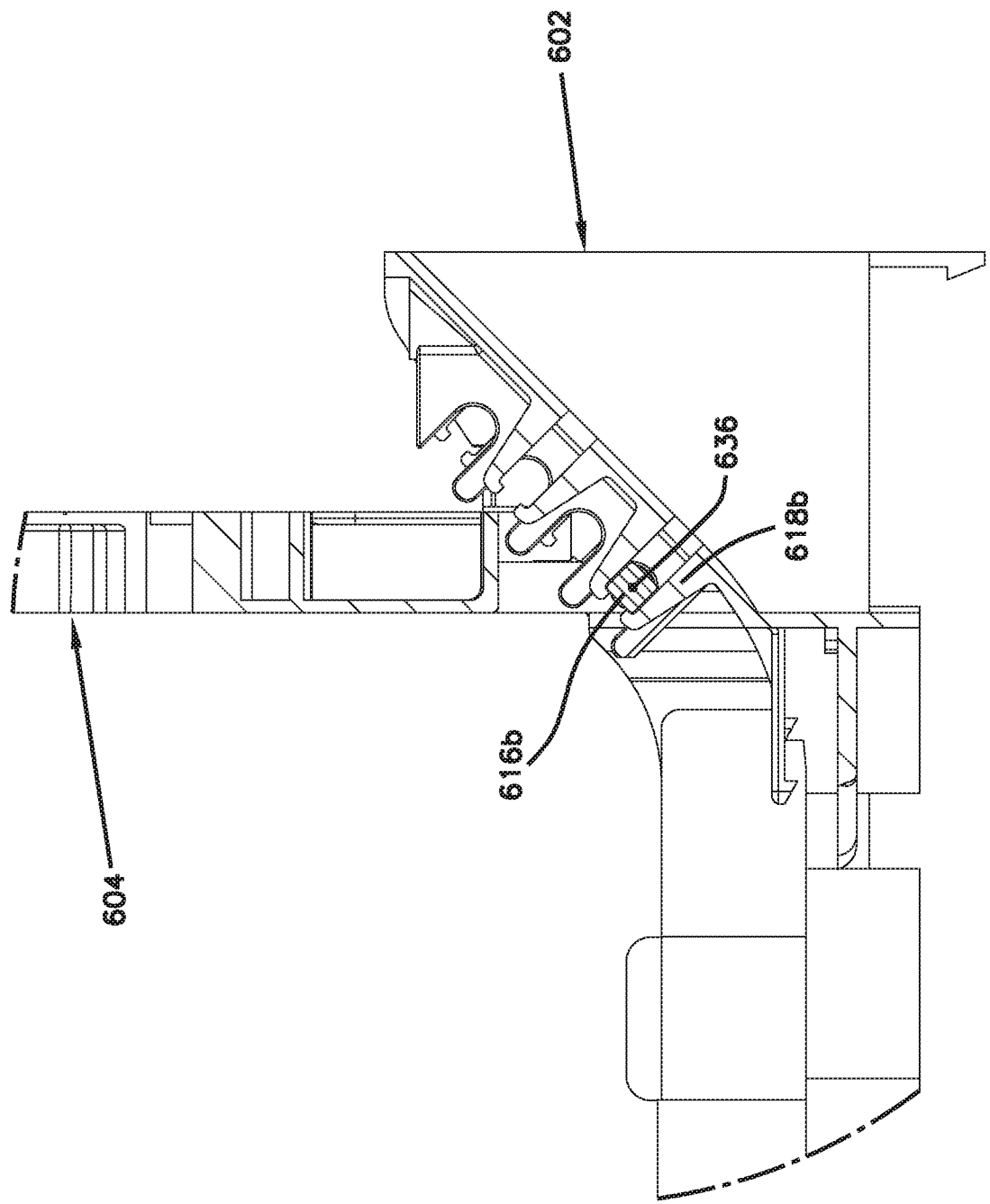
FIG. 18 shows the cross-sectional view of FIG. 16 with the tray moved to the second position.
Figure 19:
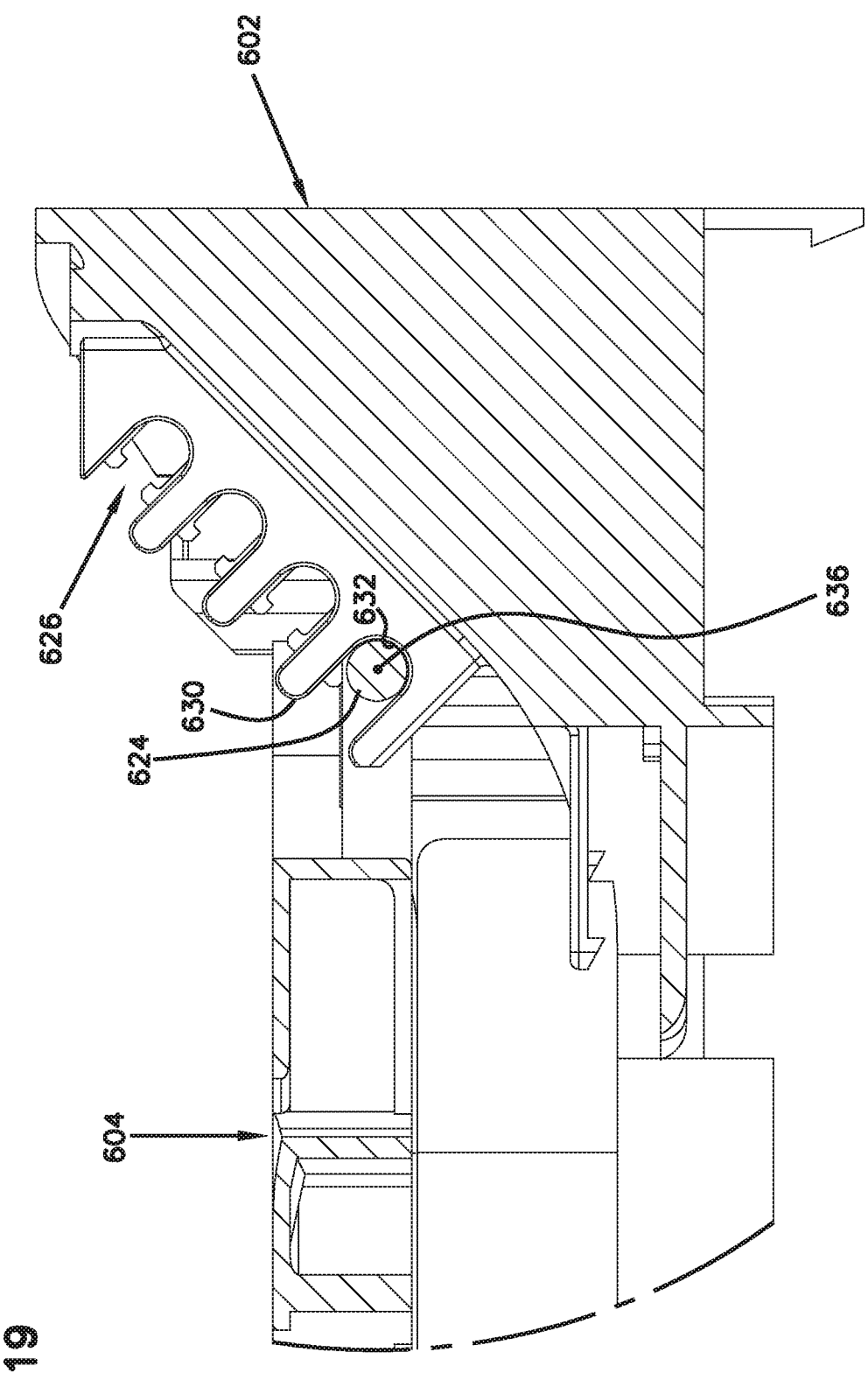
FIG. 19 is a cross-sectional view taken along the 19-19 line of FIG. 15, which cuts through one of the guide pivot arrangements.
Figure 20:
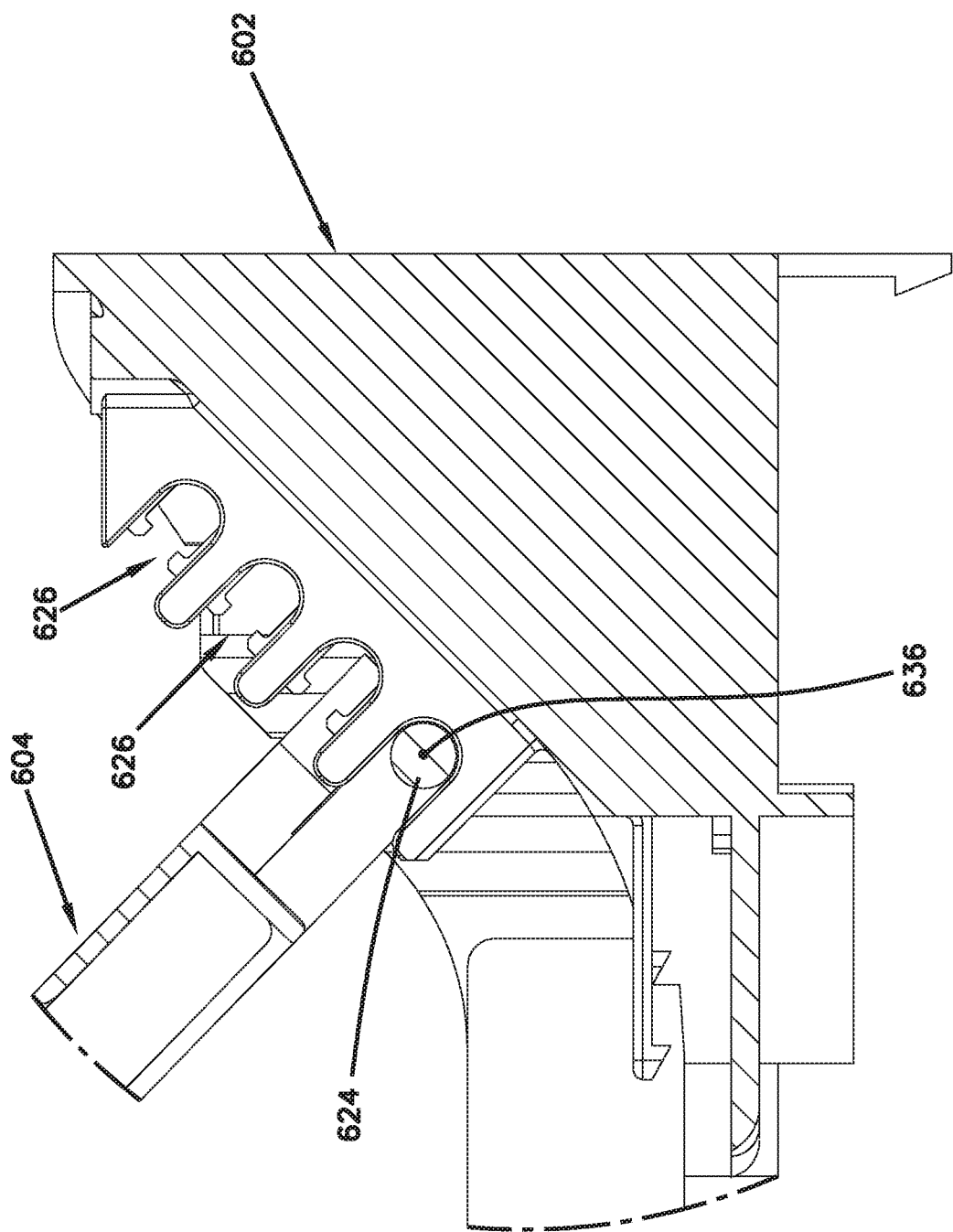
FIG. 20 shows the cross-sectional view of FIG. 19 with the tray moved to a pivotal position between the first and second position.
Figure 21:
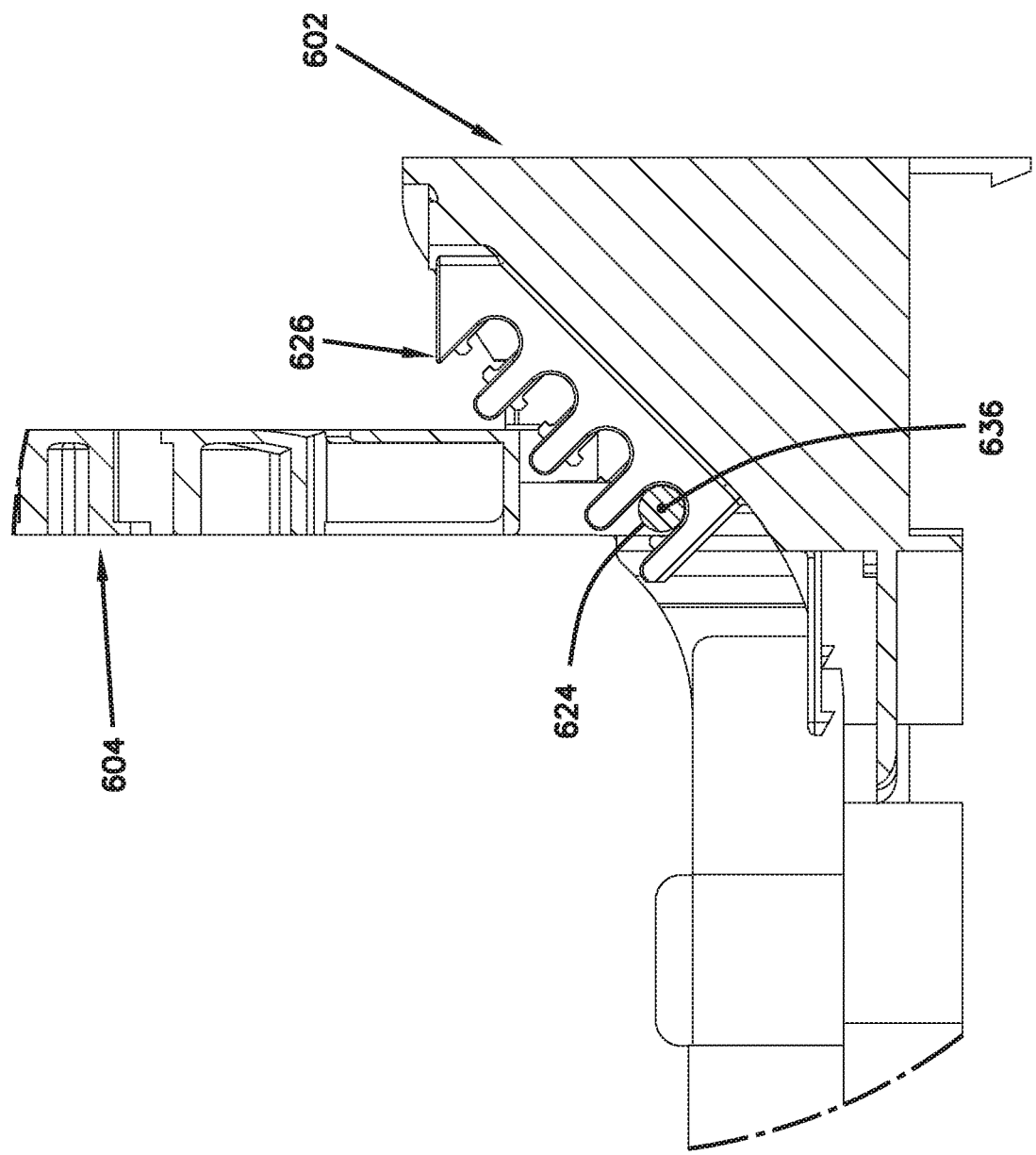
FIG. 21 shows the cross-sectional view of FIG. 19 with the tray moved to the second position.

In a preferred example, the detent pivot pin portions 616a, 616b have a square transverse cross-sectional shapes (see FIGS. 16-18). In a preferred example, the detent receptacles 618a, 618b each include first and second resilient arms 650, 651 having base ends 652 and free ends 654. The first and second resilient arms 650, 651 define the receptacle flat surfaces 622. The receptacle flat surfaces 622 corresponding to each of the first and second resilient arms 650, 6521 face toward each other. The first and second resilient arms 650, 651 flex outwardly about their base ends 652 as the fiber management tray 604 is moved between the first and second pivot positions. The first and second resilient arms 650, 651 have retainers 656 at the free ends 654 for retaining the detent pivot pin portions 616a, 616b within the detent receptacles 618a, 618b. The first and second resilient arms 650, 651 flex apart from a retaining position to an insertion position allow insertion of the detent pivot pin portions 616a, 616b past the retainers 656 and into the detent receptacles 618a, 618b. The first and second resilient arms 650, 651 resiliently return to the retaining position once the detent pivot pin portions 616a, 616b have been inserted past the retainers 656 and into the detent receptacles 618a, 618b.

What is claimed is:

1. An optical fiber management device comprising:
    a tray mount and a fiber management tray that are coupled together by a pivot interlock that when interlocked couples the tray mount and the fiber management tray together by a pivotal connection that allows the fiber management tray to pivot relative to the tray mount between a first pivot position and a second pivot position;
    the pivot interlock including a detent pivot arrangement and a guide pivot arrangement;
    the detent pivot arrangement including a detent pivot pin portion integrated with one of the tray mount and the fiber management tray, the detent pivot arrangement also including a detent receptacle integrated with the other of the tray mount and the fiber management tray, the detent receptacle being configured for receiving the detent pivot pin portion when the pivot interlock is interlocked, the detent pivot pin portion including a plurality of pin flat surfaces positioned circumferentially about the detent pivot pin portion, the detent receptacle defining a plurality of receptacle flat surfaces;
    the guide pivot arrangement including a cylindrical pivot pin portion integrated with one of the tray mount and the fiber management tray, the guide pivot arrangement also including a guide receptacle integrated with the other of the tray mount and the fiber management tray, the guide receptacle being configured for receiving the cylindrical pivot pin portion when the pivot interlock is interlocked, the guide receptacle having an open end positioned opposite from a closed end, the open end being configured to allow the cylindrical pivot pin portion to be inserted into the guide receptacle, the closed end including a guide surface having a concave curvature that curves along a convex curvature of the cylindrical pivot pin portion when the pivot interlock is interlocked; and
    wherein when the pivot interlock is interlocked, a pivot axis about which the fiber management tray pivots extends axially though the cylindrical pivot pin portion, the detent pivot pin portion, the guide receptacle, and the detent receptacle, wherein as the fiber management tray is pivoted between the first pivot position and the second pivot position, at least some of the pin flat surfaces and the receptacle flat surfaces engage one another to cause the detent receptacle to elastically deform and the cylindrical pivot pin portion concurrently pivots within the guide receptacle, and wherein an interaction between at least some of the pin flat surfaces and the receptacle flat surfaces provides a tray retention force for retaining the fiber management tray in the first and second pivot positions.

2. The optical fiber management device of claim 1, wherein the cylindrical pivot pin portion and the detent pivot pin portion are integrated with the fiber management tray, and wherein the guide receptacle and the detent receptacle are integrated with the tray mount.

3. The optical fiber management device of claim 2, wherein the detent pivot arrangement includes first and second spaced-apart detent pivot pin portions, wherein the detent pivot arrangement includes first and second spaced-apart detent receptacles that respectively receive the first and second detent pivot pin portions, wherein the guide pivot arrangement includes first and second cylindrical pivot pin portions positioned axially between the first and second detent pivot pin portions, wherein the first and second cylindrical pivot pin portions are separated by a central flange, wherein the guide pivot arrangement also includes first and second guide receptacles that respectively receive the first and second cylindrical pivot pin portions, wherein the first and second guide receptacles are separated by a central slot, and wherein when the pivot interlock is interlocked the central flange fits within the central slot to limit axial movement of the fiber management tray relative to the tray mount along the pivot axis.

4. The optical fiber management device of claim 3, wherein outer ends of the first and second spaced-apart detent pivot pin portions are integrally coupled to end flanges which are coupled to a main body of the fiber management tray, wherein inner ends of the first and second spaced-apart detent pivot pin portions are integrally coupled to outer ends of the first and second cylindrical pivot pin portions, wherein inner ends of the first and second cylindrical pivot pin portions are integrally connected to the central flange, wherein the central flange is coupled to the main body of the fiber management tray, and wherein the central flange and the end flanges offset the first and second detent pivot pin portions and the first and second cylindrical pivot pin portions from the main body of the fiber management tray.

5. The optical fiber management device of claim 1, wherein the detent receptacle elastically deforms as the fiber management tray is pivoted between the first and second pivot positions, and wherein the guide receptacle does not elastically deform as the fiber management tray is moved between the first and second pivot positions.

6. The optical fiber management device of claim 1, wherein as the fiber management tray is pivoted between the first and second pivot positions, a maximum deformation of the detent receptacle occurs at a central pivot position between the first and second pivot positions.

7. The optical fiber management device of claim 1, wherein the detent receptacle is in a stable state when the fiber management tray is in the first and second pivot positions, wherein when the detent receptacle is in the stable state the detent receptacle is either not elastically deformed or has less elastic deformation as compared when the fiber management tray has been pivoted to a pivot position between the first and second pivot positions.

8. The optical fiber management device of claim 1, wherein the detent pivot pin portion has a square transverse cross-sectional shape.

9. The optical fiber management device of claim 1, wherein the detent receptacle includes first and second resilient arms having base ends and free ends, wherein the first and second resilient arms define the receptacle flat surfaces and wherein the receptacle flat surfaces corresponding to each of the first and second resilient arms face toward each other, and wherein the first and second resilient arms flex outwardly about their base ends as the fiber management tray is moved between the first and second pivot positions.

10. The optical fiber management device of claim 9, wherein the first and second resilient arms have retainers at the free ends for retaining the detent pivot pin portion within the detent receptacle, wherein the first and second resilient arms flex apart from a retaining position to an insertion position to allow insertion of the detent pivot pin portion past the retainers and into the detent receptacle, and wherein the first and second resilient arms resiliently return to the retaining position once the detent pivot pin portion has been inserted past the retainers and into the detent receptacle.

* * * * *